US008972245B2

United States Patent
Jones et al.

(10) Patent No.: US 8,972,245 B2
(45) Date of Patent: *Mar. 3, 2015

(54) TEXT PREDICTION USING ENVIRONMENT HINTS

(71) Applicant: International Business Machines Corporation, Armonk, NY (US)

(72) Inventors: Zachary H. Jones, Apex, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,591

(22) Filed: Aug. 20, 2013

(65) Prior Publication Data

US 2014/0142923 A1     May 22, 2014

Related U.S. Application Data

(63) Continuation of application No. 13/682,594, filed on Nov. 20, 2012.

(51) Int. Cl.
*G06F 17/21* (2006.01)
(52) U.S. Cl.
USPC .............................. 704/10; 704/255; 704/257
(58) Field of Classification Search
USPC ............... 704/1–10, 251, 255, 257, 270, 252, 704/250, 256; 707/728; 709/206
See application file for complete search history.

(56) References Cited

U.S. PATENT DOCUMENTS

| | | | |
|---|---|---|---|
| 6,377,965 B1 | 4/2002 | Hachamovitch et al. | |
| 7,679,534 B2 | 3/2010 | Kay et al. | |
| 7,912,706 B2 | 3/2011 | Sparre | |
| 8,112,708 B2 | 2/2012 | Griffin et al. | |
| 2006/0230350 A1 | 10/2006 | Baluja | |
| 2006/0247915 A1 | 11/2006 | Bradford et al. | |
| 2008/0126075 A1* | 5/2008 | Thorn ............................... | 704/3 |
| 2008/0147651 A1 | 6/2008 | Bhogal et al. | |
| 2008/0310723 A1 | 12/2008 | Manu et al. | |
| 2008/0313182 A1 | 12/2008 | Vasa | |
| 2009/0106695 A1 | 4/2009 | Perry et al. | |
| 2009/0306969 A1 | 12/2009 | Goud et al. | |
| 2010/0070921 A1 | 3/2010 | Rieman et al. | |
| 2010/0114887 A1 | 5/2010 | Conway et al. | |

(Continued)

OTHER PUBLICATIONS

Bishop, B., "Swype Beta Debuts Context-Aware Prediction Engine in First OTA Update", [online], [Retrieved on Mar. 30, 2012]. Retrieved from the Internet at <URL: http://www.theverge.com/2011/11/4/2537045/swype-beta-update>, Vox Media, Inc., © 2012, Total 16 pp.

(Continued)

*Primary Examiner* — Huyen X. Vo
(74) *Attorney, Agent, or Firm* — Janaki K. Davda; Konrad, Raynes, Davda and Victor LLP

(57) ABSTRACT

Provided are techniques for text prediction using environment hints. A list of words is received, wherein each word in the list of words has an associated weight. For at least one word in the list of words, an environment weight is obtained from an environment dictionary. The associated weight of the at least one word is updated using the obtained environment weight. The words in the list of words are ordered based on the updated, associated weight of each of the words.

7 Claims, 7 Drawing Sheets

(56) References Cited

U.S. PATENT DOCUMENTS

| | | | |
|---|---|---|---|
| 2010/0130236 A1 | 5/2010 | Sivadas et al. | |
| 2010/0257165 A1* | 10/2010 | Jin et al. | 707/728 |
| 2010/0318903 A1 | 12/2010 | Ferren | |
| 2011/0087961 A1 | 4/2011 | Fitusi et al. | |
| 2011/0112825 A1 | 5/2011 | Bellegarda | |
| 2014/0101267 A1* | 4/2014 | Paparizos et al. | 709/206 |

OTHER PUBLICATIONS

Dominowska, E., "A Communication Aid with Context-Aware Vocabulary Prediction", Submitted to the Department of Electrical Engineering and Computer Science, May 2002, Total 136 pp. (Available at http://www.lifewear.gatech.edu/resources/Dominowska_-_A_Communication_Aid_with_Context-Aware_Vocabulary_Prediction.pdf).

Dunlop, M.D. and F. Taylor, "Tactile Feedback for Predictive Text Entry", CHI ACM, Boston, MA, USA, Apr. 4-9, 2009, pp. 2257-2260. [Also Total 4 pp.].

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

Stocky, T., A. Faaborg, and H. Lieberman, "A Commonsense Approach to Predictive Text Entry", CHI ACM, Vienna, Australia, Apr. 24-29, 2004, pp. 1-4. [Also Total 4 pp.].

Suematsu, S., Y. Arakawa, S. Tagashira, and A. Fukuda, "Network-based Context-Aware Input Method Editor", ICNS IEEE 6th International Conference on, Mar. 7-13, 2010, pp. 1-6. [Also Total 6 pp.].

US Patent Application, dated Nov. 20, 2013, for U.S. Appl. No. 13/682,594, filed Nov. 20, 2012, entitled "Text Prediction Using Environment Hints", invented by Z.H. Jones et al., Total 32 pages.

Preliminary Amendment, dated Aug. 20, 2013, for U.S. Appl. No. 13/682,594, filed Nov. 20, 2012 entitled, "Text Prediction Using Environment Hints", invented by Z.H. Jones et al., Total 6 pages.

Office Action, dated Jun. 17, 2014, for U.S. Appl. No. 13/682,594, filed Nov. 20, 2012, invented by Z.H. Jones et al., Total 23 pages.

Response to Office Action, dated Sep. 17, 2014, for U.S. Appl. No. 13/682,594, filed Nov. 20, 2012, invented by Z.H. Jones et al., Total 12 pages.

Notice of Allowance, dated Oct. 3, 2014, for U.S. Appl. No. 13/682,594, filed Nov. 20, 2012, invented by Z.H. Jones et al., Total 13 pages.

* cited by examiner

TEXT PREDICTION USING ENVIRONMENT HINTS

CROSS-REFERENCE TO RELATED APPLICATION

This patent application is a continuation of U.S. patent application Ser. No. 13/682,594, filed on Nov. 20, 2012, which patent application is incorporated herein by reference in its entirety.

FIELD

Embodiments of the invention relate to text prediction using environment hints.

BACKGROUND

Auto-completion of words is a feature seen in contexts such as text messaging, word processing, web forms, cloud applications, etc. Such auto-completion takes into account the context of a word in a sentence. The auto-completion receives a portion of a word (e.g., one or more letters), and provides auto-completion suggestions. For example, if a user types in "mont", then the auto-completion suggestions may include "month".

SUMMARY

Provided are a method, computer program product, and system for text prediction using environment hints. A list of words is received, wherein each word in the list of words has an associated weight. For at least one word in the list of words, an environment weight is obtained from an environment dictionary. The associated weight of the at least one word is updated using the obtained environment weight. The words in the list of words are ordered based on the updated, associated weight of each of the words.

BRIEF DESCRIPTION OF THE SEVERAL VIEWS OF THE DRAWINGS

Referring now to the drawings in which like reference numbers represent corresponding parts throughout:

FIG. 2 is formed by FIG. 2A and FIG. 2B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
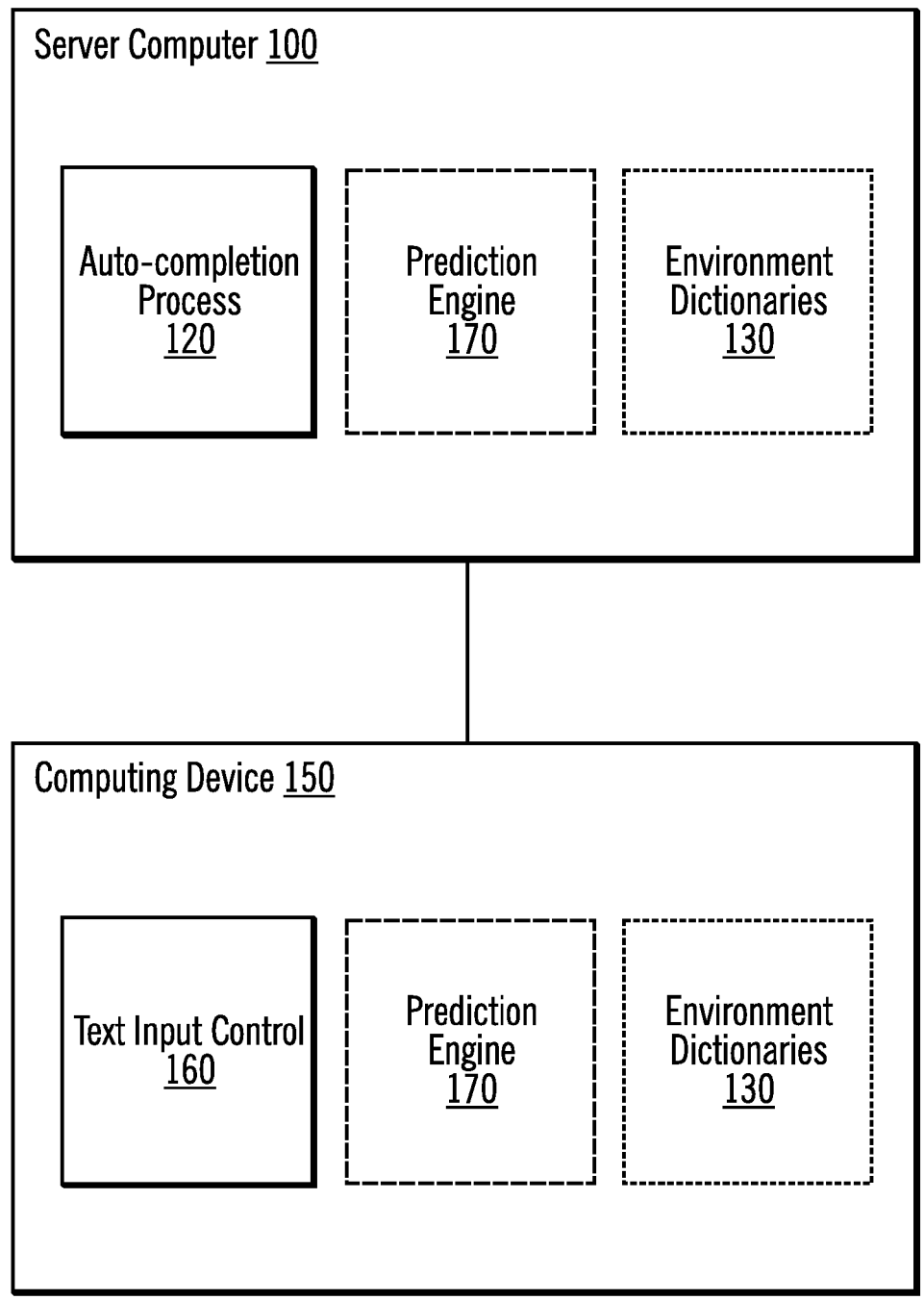
FIG. 1 illustrates a computing environment in accordance with certain embodiments.

FIG. 1 illustrates a computing environment in accordance with certain embodiments. A server computer 100 is coupled to a computing device 150 (e.g., a client computer, a tablet computer, a personal digital assistant (PDA), portable device, etc.). The server computer 100 includes an auto-completion process 120 and one or more environment dictionaries 130. In certain embodiments, such as a cloud environment, the server computer 100 includes a prediction engine 170. The environment dictionaries 130 include information about the environment that may be used as hints in predicting completion of a word that a user is typing.

The computing device 150 includes a text input control 160 and may include a prediction engine 170 and one or more environment dictionaries 130. For example, in a cloud environment, the prediction engine 170 and the one or more environment dictionaries 130 may reside on just the server computer 100.

The user enters text (e.g., one or more characters of a word) into the text input control 160, and, while the user is inputting the text, the prediction engine 170 uses the one or more environment dictionaries 130 to provide auto-completion suggestions that the user may select from to complete the text.

In certain embodiments, the environment dictionaries 130 may be pushed from the server computer 100 to one or more computing devices (such as computing device 150) as updates occur. In certain alternative embodiments, the environment dictionaries 130 may be pulled by the one or more computing devices from the server computer 100 as needed or periodically.

The prediction engine 170 takes into account a broader sense of physical context based prediction by looking at the environment (e.g., current weather conditions, location, date, user's activities, etc.). Using environment hints enables the prediction engine 170 to more accurately predict the words that are most relevant to a user at a given time. This is especially useful on small devices where typing is difficult for some users.

The prediction engine 170 introduces the idea of environment based hints for auto completion of words. An environment hint may take many forms, such as time of year, Global Positioning System (GPS) coordinates, altitude, velocity air temperature, humidity, barometric pressure, ambient light, etc. In certain embodiments, the environment hints are obtained from sensors collecting data. In certain embodiments, a user or other individual or application may provide the environment hints. These environment hints may be used in combination to determine many attributes of what a user is doing/viewing at the current moment on a computer or portable device, what words may be more relevant in the current environment, and what the user's level of expertise is. Additionally, facial recognition software may be used to evaluate the user's mood/environment information to further enhance the text prediction. Moreover, the prediction engine 170 may learn about environment hints in the case of a distributed system, such as web forms, cloud applications, etc., by observing word usage trends as they correlate to the environment cues.

The prediction engine 170 adds an additional factor to the auto-completion processing. In certain embodiments, once the auto-completion process 120 chooses words expected to complete a portion of a word (i.e., letters entered so far) that the user has input, the prediction engine 170 adds a new factor in the weighting of the selected words. The additional factor is an aggregation of environment values.

In certain embodiments, an environment dictionary 130 is provided for each environment factor (e.g., time, location, weather, etc.). Each environment dictionary 130 includes words that are related to the environment factor. For example, the time dictionary may include: 1) seasonal words such as Autumn and foliage; 2) holidays such Christmas and Halloween, and 3) words related to smaller scopes of time such as the days of the week.

Each environment dictionary 130 includes an environment weighting for each word. For example, the words Autumn and foliage may be more commonly used words during the Fall season; while the words Christmas, shopping, and decorating may be more commonly used words as the holiday season approaches.

Also, the same word may be included in multiple environment dictionaries 130. For example, the words snow, ice, and blizzard may be used during winter months and may be included in the time dictionary 130 as associated with a winter season. In addition, the words snow, ice, and blizzard may describe weather around the approach or passing of a winter storm, which would be measured via air temperature, humidity, and barometric pressure, and may be included in a weather dictionary 130.

In certain embodiments, the environment dictionaries 130 may be static and remain unchanged. In certain other embodiments, the environment dictionaries 130 may be dynamically generated. For example, as a user is looking at a document and writing an email on the side related to that document, the prediction engine 170 generates the environment dictionaries 130 for the document that the user is looking at and dynamically feeds the environment dictionaries 130 into the prediction of the word for auto-completion.

For a given word in the auto-complete list, the prediction engine 170 searches each environment dictionary 130 and obtains an overall environment weight that can be based on one or more factors in the environment dictionaries 130. The environment weight is factored into the weight obtained by the auto-completion process 120. After the environment weight is factored in, the prediction engine 170 generates a final ordering of the words and presents these in the auto-completion list to the user.

The environment weight may be described as a value based on external factors affecting people or based on a set of external conditions (e.g., those affecting a particular activity), such as current weather conditions, location, date, user's activities, etc.

The prediction engine 170 may use a pre-defined library of environment hints, as well as automatically learn new hints in the case of a distributed environment (e.g., web forms, cloud applications, etc).

In particular, the prediction engine 170 provides environment hints for auto completion of words and uses the environment hints in combination with each other to determine attributes of what a user is doing/viewing at the current moment on the computing device 100. Also, the prediction engine 170 learns about new environment hints (e.g., in the case of a distributed system such as web forms, cloud applications, etc.) by observing word usage trends as they correlate to the environment cues.

Merely to enhance understanding of embodiments, examples are provided herein.

In a first example, in the case of "time of year" hints in the fourth quarter of the calendar year, a text input of "Chr" may result in a prediction of "Christmas", whereas in the second quarter, the same text input may result in a prediction of "Chris". However, the user may be located (e.g., determined with GPS coordinates) in a country that does not celebrate this holiday, so the "Christmas" prediction may not be used in that environment. The more hints that can be correlated, the more accurate the prediction becomes.

In a second example, Lin is switching between reading web pages (e.g., that were identified from a search from an internet search engine) and drafting a document using a document tracking database. Based on the web pages she viewed most recently, the prediction engine 170 builds a collection of environment dictionaries 130 that contain words, phases that are of interest to her, etc. As she continues drafting her document, these words in the environment dictionaries 130 are given a higher weight compared with other words (i.e., not in the environment dictionaries 130) when providing a suggestion for auto-completion of a word. For example, if she looked at web pages related to a Web Conference and Instant Messaging, whenever she types "Ins", the prediction engine 170 may suggest "Instant" at the top of the list of auto-completion suggestions.

Figure 2A:
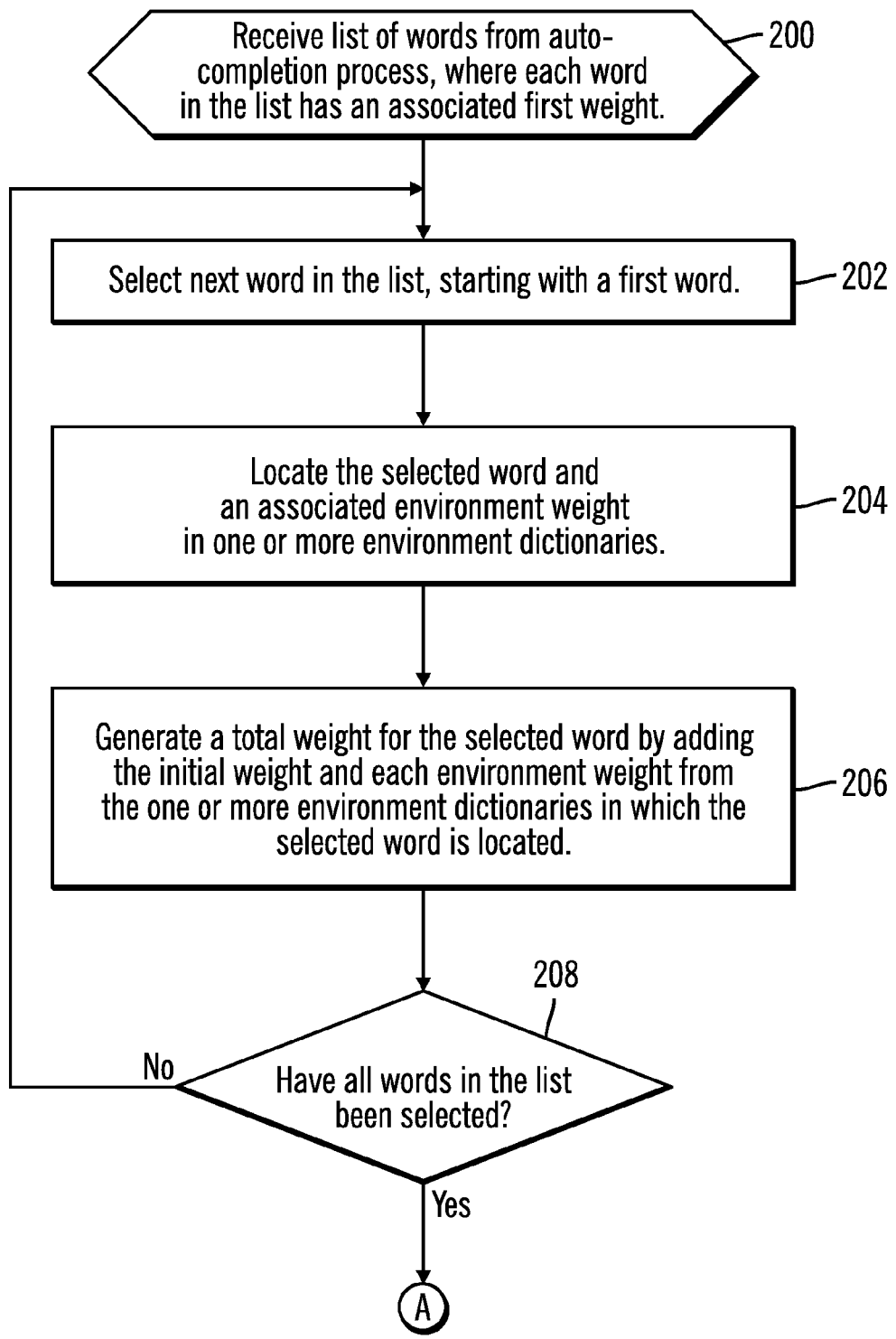
FIG. 2 illustrates, in a flow diagram, operations for providing auto-completion suggestions in accordance with certain embodiments.
Figure 2B:
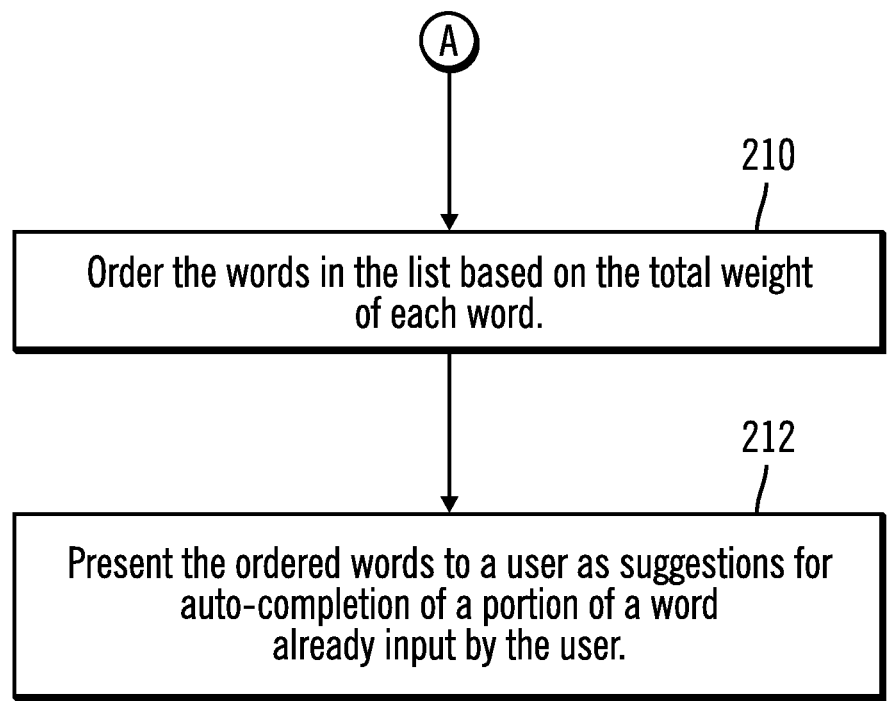

FIG. 2 illustrates, in a flow diagram, operations for providing auto-completion suggestions in accordance with certain embodiments. FIG. 2 is formed by FIG. 2A and FIG. 2B.

In FIG. 2A, control begins at block 200 with the prediction engine 170 receiving a list of words from the auto-completion process 120, where each word in the list has an associated initial weight. In block 202, the prediction engine 170 selects a next word in the list, starting with a first word in the list. In block 204, the prediction engine 170 locates the selected word and an associated environment weight in one or more environment dictionaries 130. In certain embodiments, the prediction engine 170 searches for the selected word in every environment dictionary 130. In alternative embodiments, the prediction engine 170 searches for the selected word in a subset (e.g., one or more) of the environment dictionaries 130. In certain embodiments, the subset of environment dictionaries are used based on the environment of the user (e.g., if the user is reading text messages, a subset of dictionaries known to be related to text messages may be selected).

In block 206, the prediction engine 170 generates a total weight for the selected word by adding the initial weight and each environment weight from the one or more environment dictionaries in which the selected word is located.

In block 208, the prediction engine 170 determines whether all the words in the list have been selected. If so, processing continues to block, otherwise, processing continues to block 210 (FIG. 2B).

In block 210, the prediction engine 170 orders the words in the list based on the total weight of each word. In certain embodiments, the words are ordered by highest total weight to lowest total weight. In certain embodiments, if multiple words have the same total weight, the prediction engine 170 orders the words based on other factors (e.g., most recently used item or length of the words).

In block 212, the prediction engine 170 presents the ordered words to a user as suggestions for auto-completion of a portion of a word already input by the user.

In certain embodiments, the prediction engine 170 works in the context of a user having one or more social networks. A social network may be described as a group of two or more users using computing devices to communicate with each other.

Figure 3:
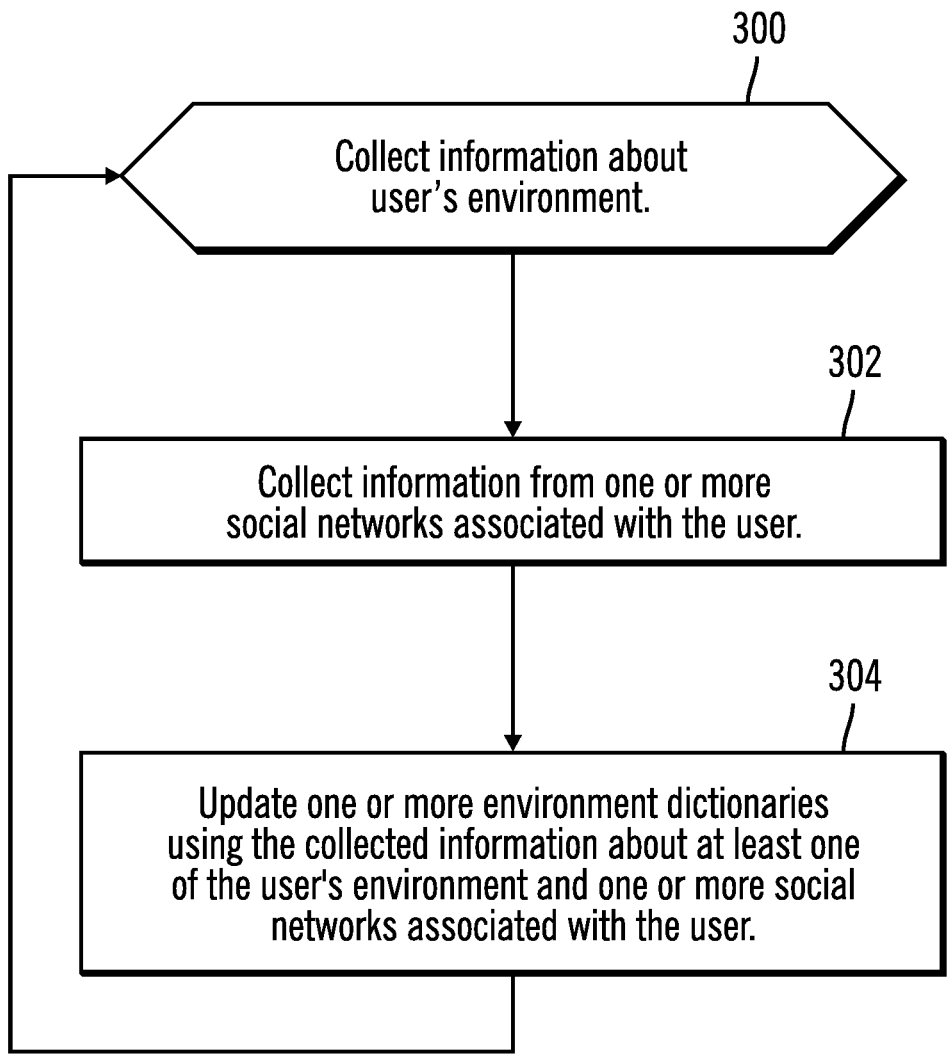
FIG. 3 illustrates, in a flow diagram, operations for creating one or more environment dictionaries in accordance with certain embodiments.

FIG. 3 illustrates, in a flow diagram, operations for creating one or more environment dictionaries using one or more social networks in accordance with certain embodiments. In FIG. 3, control begins in block 300 with the prediction engine 170 collecting information about a user's environment. For example, the prediction engine 170 collects information about user actions (e.g., opening applications, reviewing documents, sending text messages, etc.) and the user's location as they occur.

In block 302, the prediction engine 170 collects information from one or more social networks associated with the user. For example, the prediction engine 170 may collect information about what other users in a social network are reviewing, where the other users are, with whom the user is texting, etc.

In block 304, the prediction engine 170 updates one or more environment dictionaries 130 using the collected information about at least one of the user's environment and one or more social networks associated with the user. In certain embodiments, the updating includes generating new environment dictionaries 130 and adding information to the new environment dictionaries 130. Thus, the prediction engine 170 builds custom environment dictionaries 130 (e.g., general and friend specific) based on the locations, actions, and trends of the user and other uses in the social network.

Form block 304, processing loops back to block 300. Thus, the prediction engine 170 may be constantly updating the environment dictionaries 130 such that they account for prior history and are influenced by the current events of the user and other users in the social network.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
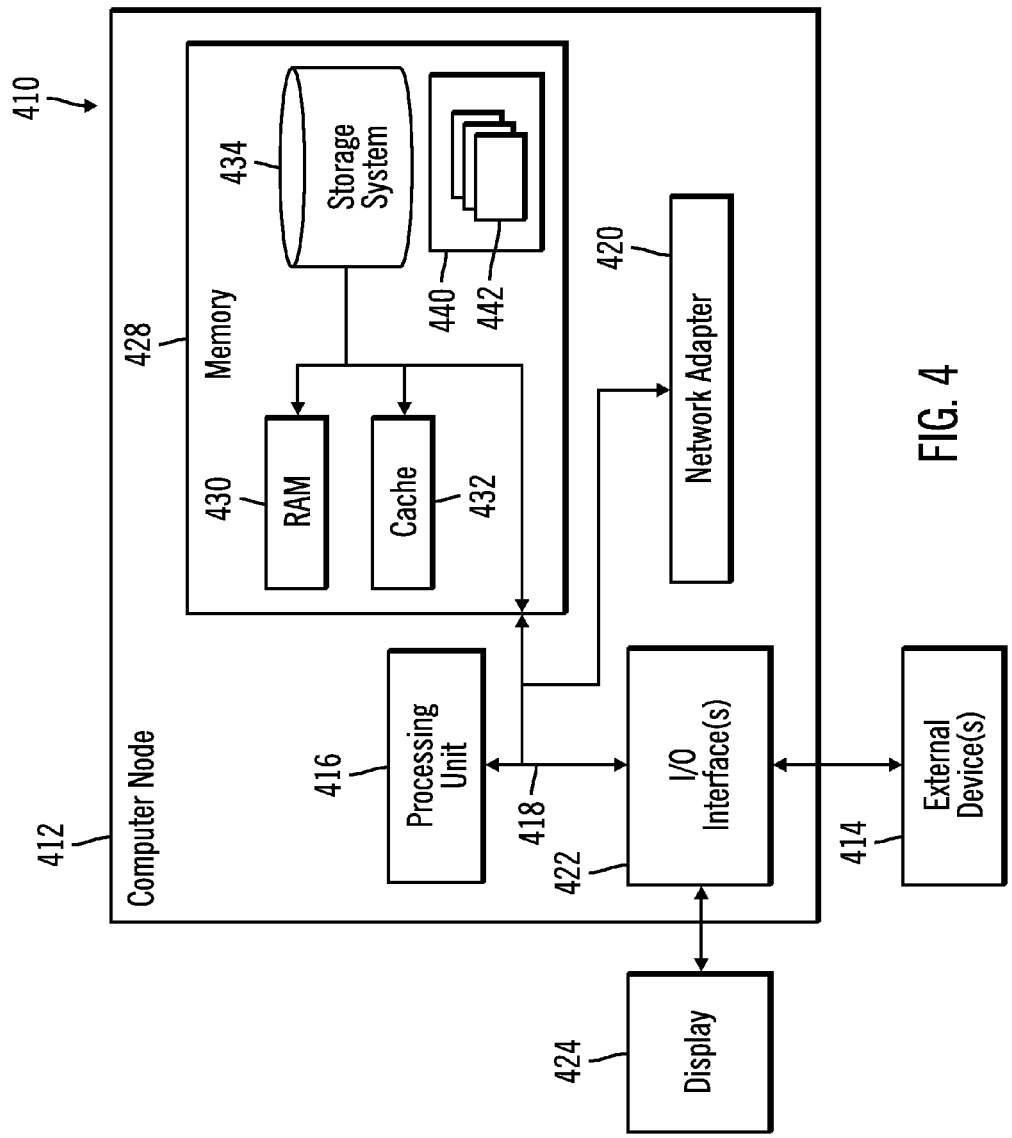
FIG. 4 depicts a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to a processor or processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
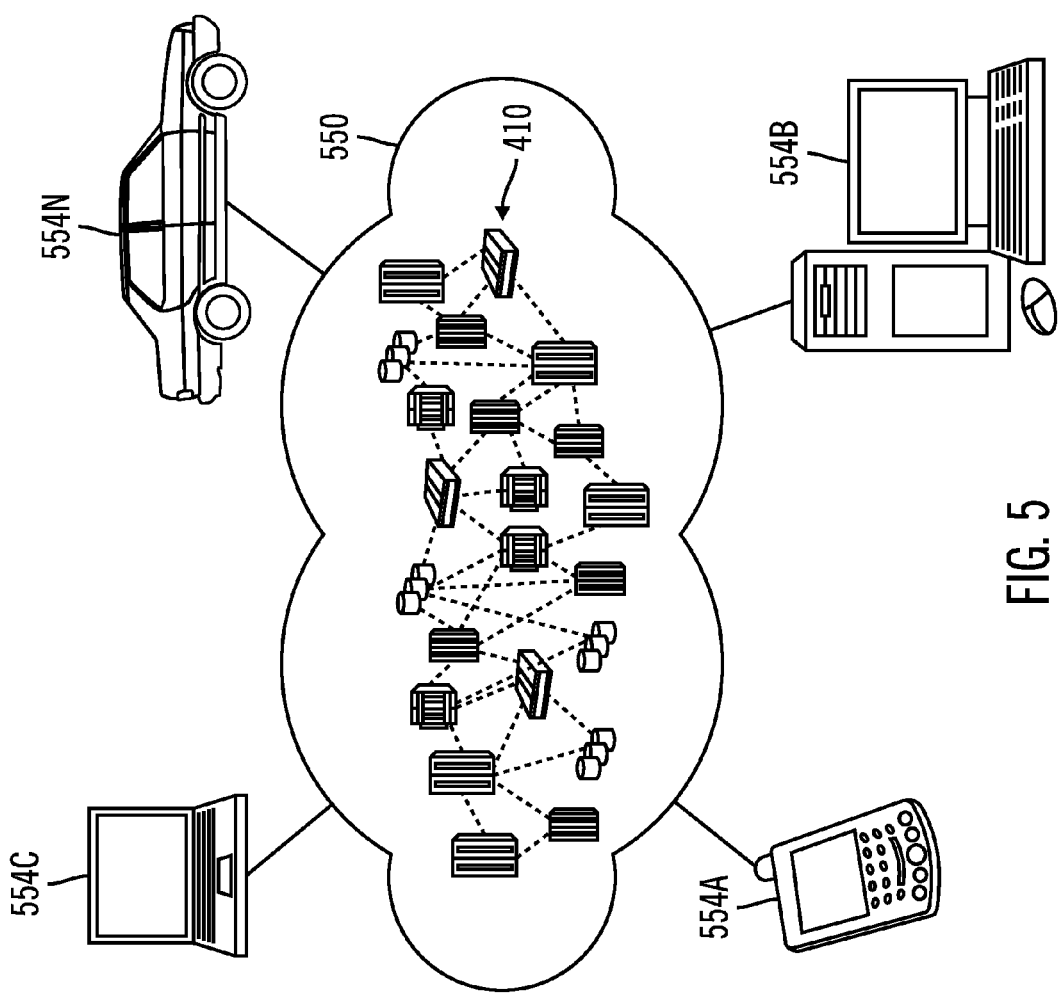
FIG. 5 depicts a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
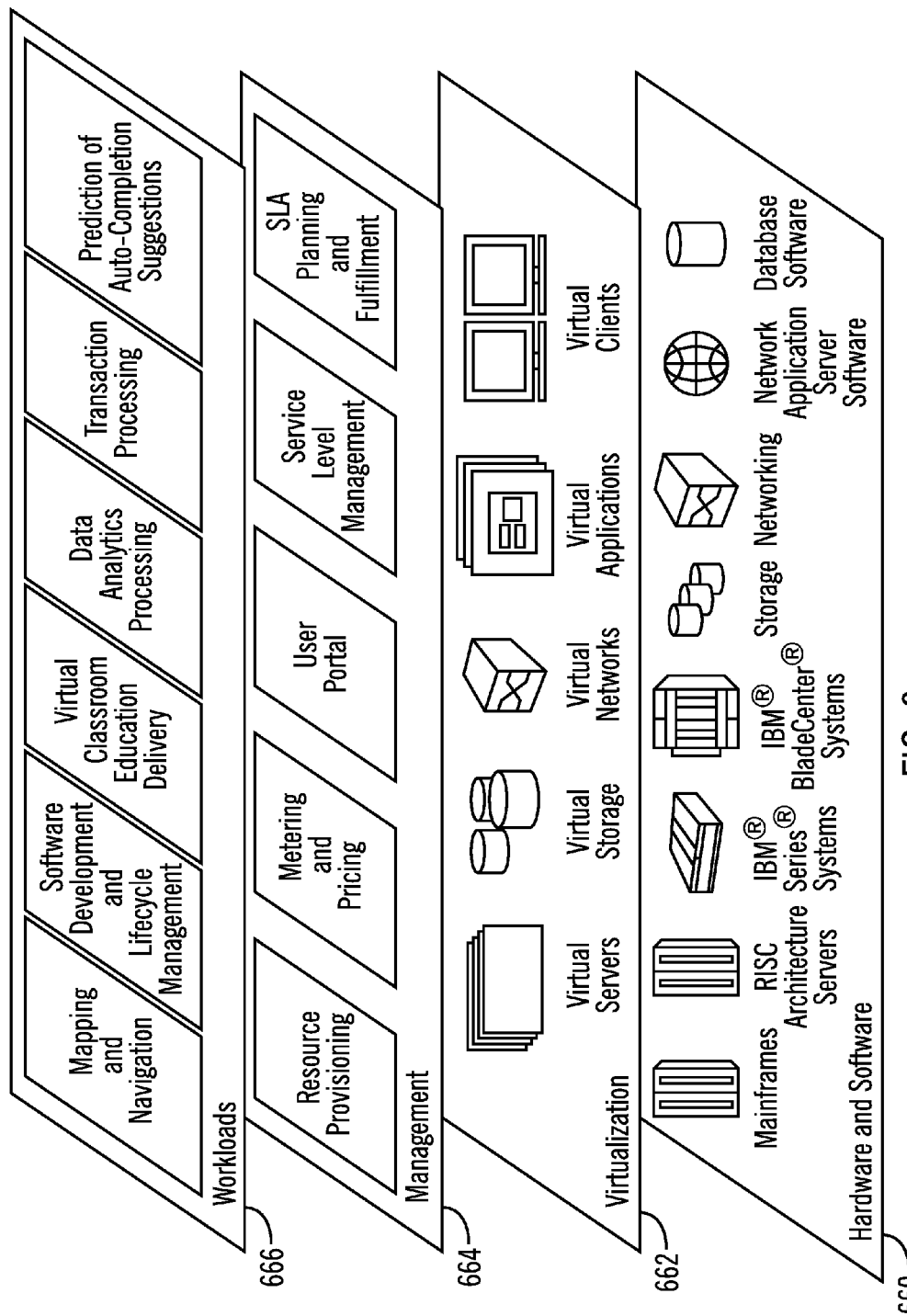
FIG. 6 depicts abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and prediction of auto-completion suggestions.

Thus, in certain embodiments, software or a program, implementing prediction of auto-completion suggestions in accordance with embodiments described herein, is provided as a service in a cloud environment.

In certain embodiments, the server computer 100 and/or the computing device 160 has the architecture of computing node 410. In certain embodiments, the server computer 100 and/or the computing device 160 is part of a cloud environment. In certain alternative embodiments, the server computer 100 and/or the computing device 160 is not part of a cloud environment. In embodiments in which the server computer 100 is part of the cloud embodiment, the prediction engine 170 may execute on the server computer 100 to provide a service of predicting auto-completion suggestions.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
    dynamically generating, using a processor of a computer, an environment dictionary for a document that is being viewed based on information from one or more social networks associated with the user; and
    in response to receiving a portion of a word for the document,
        receiving a list of words for use in completing the portion of the word, wherein each word in the list of words has an associated weight;
        for at least one word in the list of words, obtaining an environment weight from the dynamically created environment dictionary;
        updating the associated weight of the at least one word using the obtained environment weight; and
        ordering the words in the list of words based on the updated, associated weight of each of the words.

2. The method of claim 1, further comprising:
    collecting information from an environment of a user; and
    generating a new environment dictionary based on the collected information.

3. The method of claim 1, further comprising:
    collecting the information from the one or more social networks associated with the user.

4. The method of claim 1, further comprising:
    updating the environment dictionary based on new information collected from at least one of an environment of the user and the one or more social networks associated with the user.

5. The method of claim 1, further comprising:
    presenting the ordered words to a user as suggestions for completion of the portion of the word input by the user.

6. The method of claim 1, further comprising:
    receiving the list of words from an auto-completion process that generates the list of words as suggestions for completion of the portion of the word input by the user.

7. The method of claim 1, wherein a Software as a Service (SaaS) is provided to perform the method.